April 5, 1955 R. A. SALOMONE ET AL 2,705,344
APPARATUS FOR FORMING A PANELBOARD UNIT
Filed Sept. 12, 1951 2 Sheets-Sheet 1
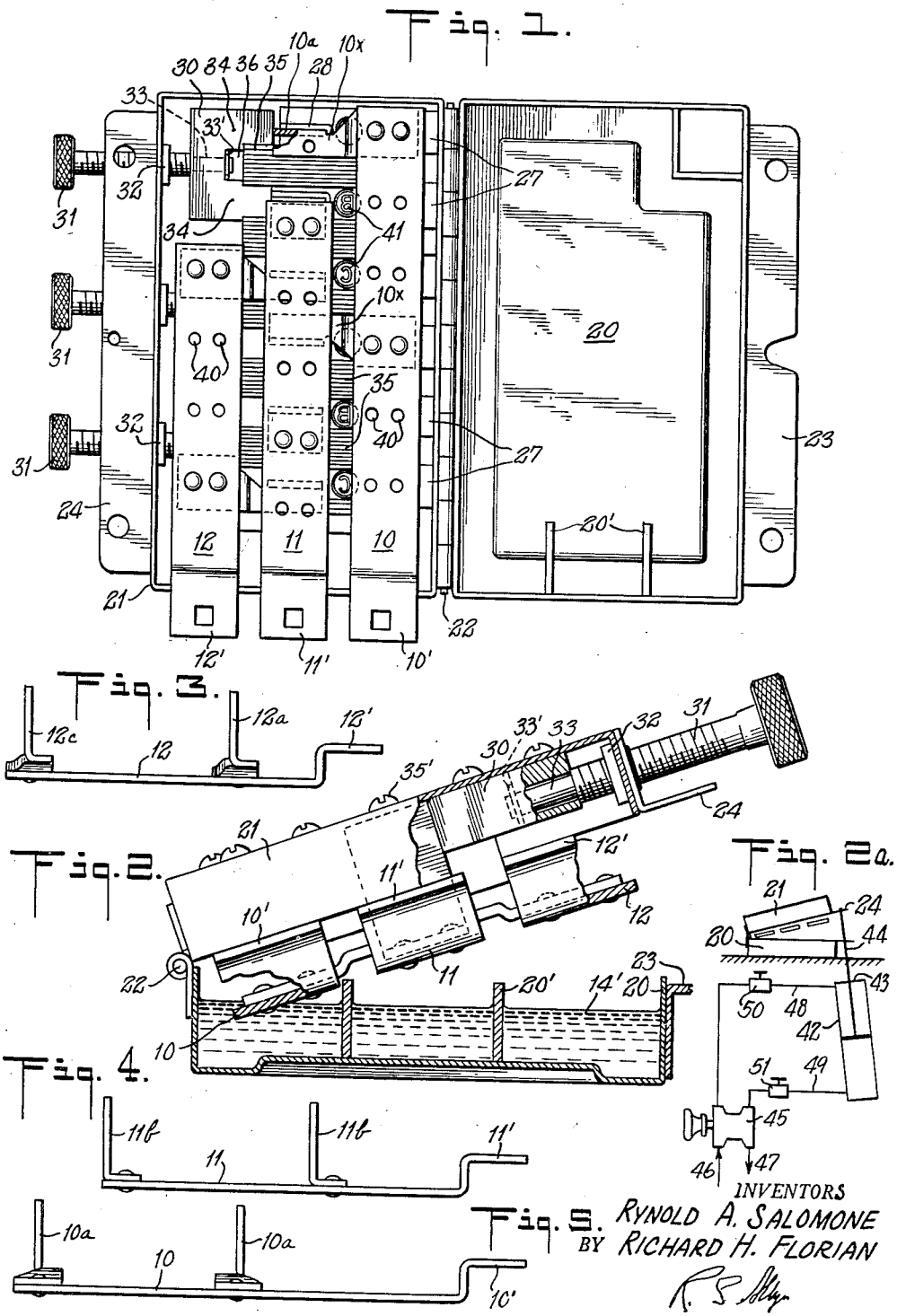
INVENTORS
RYNOLD A. SALOMONE
BY RICHARD H. FLORIAN
ATTORNEY

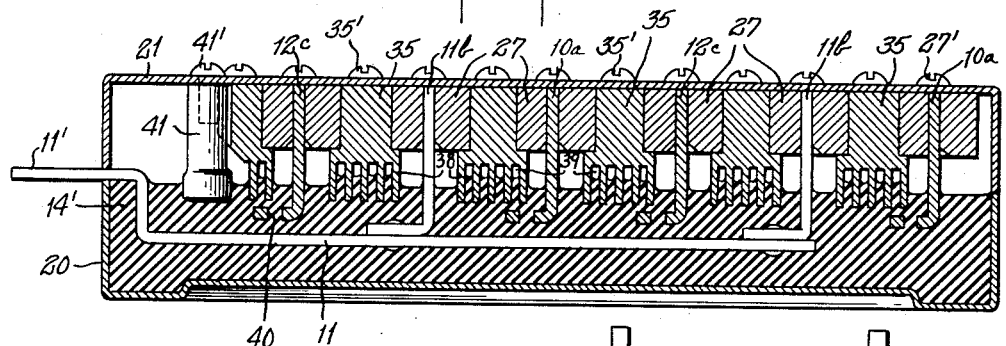

United States Patent Office 2,705,344
Patented Apr. 5, 1955

2,705,344
APPARATUS FOR FORMING A PANELBOARD UNIT

Rynold A. Salomone and Richard H. Florian, Plainville, Conn., assignors to General Electric Company, a corporation of New York Application September 12, 1951, Serial No. 246,282

3 Claims. (Cl. 18—36)

This invention relates to apparatus for forming a panelboard unit of the type set forth in copending application Serial Number 274,749, filed by William J. Fleming on March 4, 1952, assigned to the same assignee as the present invention and which is a continuation-in-part of application Serial Number 184,759, filed September 14, 1950, and now abandoned and in copending application Serial Number 273,475, filed by Herman J. Hammerly et al. on February 26, 1952, assigned to the same assignee as the present invention which is a continuation of application Serial Number 184,086 filed September 9, 1950, and now abandoned.

Said panelboard unit consists of a number of parallel bus bars embedded in a molded body and having terminals and contact blades projecting from the surface of the body.

The accompanying drawings show a preferred form of apparatus embodying the invention consisting of a pan or tray for receiving liquid from which the body is to be formed, together with a carrier in the end of a jig for carrying the bus bars to be immersed in the liquid, and dies for modifying the surface.

The main object is to provide an improved apparatus for forming an efficient plastic molded panelboard unit for an electric power distribution system.

One object is to provide apparatus with means for accurately supporting a plurality of bus bars with projecting blades in position so that the bars may be immersed in a plastic bath with the blades projecting therefrom.

Another object is to provide apparatus of this kind with means for positioning the contact blades of a plurality of parallel disposed bus bars in a single column.

Another object is to provide apparatus of this kind with improved means for adjusting and clamping the bus bar blades in proper position.

Another object is to provide simple means for forming identifying phase indicia on the surface of the base of the panelboard unit.

Another object is to provide apparatus of this kind that is simple and rugged in construction.

Another object is to provide means for ribbing the surface of the unit between the adjacent contact blades of different phases.

Fig. 1 shows a plan view of the improved apparatus in open position, parts being broken away and showing the bus bars in place in the carrier.

Fig. 2 is a part sectional and part elevational view showing the pan for containing the liquid and the carrier in position for immersing the bus bars in the liquid.

Fig. 2a is a diagrammatic view showing apparatus for controlling the closing or immersion action of the carrier.

Figs. 3, 4 and 5 are edge views on a smaller scale showing three bus bars with their projecting contact blades.

Fig. 6 is a perspective view showing a fragment of one end of a bus bar with a contact blade offset from the body thereof.

Fig. 7 is a longitudinal sectional view of the apparatus with the bus bars and their blades in the positions they occupy at the completion of the molding process.

Fig. 8 is an enlarged fragmentary sectional view showing two of the contact blades and the intervening transverse ribs and grooves.

Fig. 9 is an exploded perspective view of parts of the bus bar holding parts.

Fig. 10 is a perspective view of the complete panelboard unit as formed by the apparatus.

As shown in Fig. 10, the completed panelboard unit made in accordance with the invention has a base or body 14 formed of an insulating substance, such as a thermo-setting composition called "Plastisol." Bus bars, such as 10, 11 and 12 are embedded or molded in the base and have projecting main offset terminals 10', 11' and 12', respectively, at their ends. These bus bars have a number of contact blades, such as 10a, 11b, 12c, respectively, all of the contact blades projecting from the surface of the base in a single row or column spaced therealong. Between each two adjacent blades, the surface of the body is formed with a group 15 of transverse grooves 16 and ribs 17 extending laterally of the contact blades such ribs and grooves being provided in order to provide in effect a longer surface path between the blades. A similar group 15' of ribs and grooves between the blade 12c and the terminal 11' is also provided.

The pan 20 is provided to contain the liquid plastic 14' from which the body is to be formed. The jig or carrier 21 is hinged to the pan as indicated at 22 along one edge. The pan and carrier may have projecting flanges 23 and 24, respectively, adapted to be connected together when the holder is in closed position as shown in Fig. 7.

Within the carrier are mounted parts which serve to hold and position the bus bars and blades preparatory to positioning them in the liquid. A blade guide member 27 is suitably secured to the carrier to accommodate each one of the blades. For this purpose, each guide member is provided at one end with a slot 28, closed on the righthand side as seen in Fig. 9, of substantially the thickness of the blade to be received and the length of the slot is slightly less than the width of the blade so that one side edge thereof projects beyond the outer open side of the slot as shown in Fig. 1. The guide members 27 are spaced and positioned in alinement along the carrier with the slots substantially in the center of the carrier.

A blade clamping block 30 is slidably mounted on the carrier and is provided with an actuating and clamping screw 31 passing through the side wall of the carrier and threaded in a bushing 32 in the said wall and having a reduced unthreaded neck 33 located in an opening in the block and rotatably held therein by means of the split washer 33' so that by turning the screw 31 the clamping block 30 will be moved toward or from the guide blocks 27, 27. A clamping block is provided for each pair of adjacent guide blocks 27. Each clamping block is provided with lateral extensions 34, 34 facing the open slot sides of the pair of guide blocks and adapted to engage the side edges of the two bus bar blades in the adjacent guide blocks.

A ribbing block or die 35 is secured to the carrier between each pair of guide blocks, by screws 35' and one end is positioned in the space 37 between two adjacent guide blocks 27. Each clamping block 30 has a channel 36 between the extensions 34, 34, the walls of which channel are adapted to slide along the opposed edges of the extension of the adjacent ribbing block 35 and is guided thereby. The outer surface of each ribbing block is provided with alternate projecting ribs 38 and grooves 39.

Dies 41 are secured to the guide blocks 27 in alinement and extend outwardly along the sides of the contact blades. These dies bear phase indicating letters such as "A," "B" and "C" whereby such letters are formed on the finished unit as shown in Fig. 10.

The dies 41 for forming the phase indicating characters are located so as to engage the surface of the liquid when the carrier is in the closed position. Similar dies are provided for producing identifying letters adjacent the respective terminals of the bus bars.

It will be noted from Fig. 4 that the center bus bar 11 has two alined contact blades 11b, 11b, each projecting directly at a right angle to the bus bar while each of the lateral bus bars 10 and 12 is provided with lateral offset arms 10x in order to locate their contact blades in alinement with the contact blades of the center bus bar 11.

Each of the bus bars and each of the offset arms 10x is provided with a perforation 40 in order to permit the liquid plastic to pass through and to minimize the possibility of formation of bubbles.

To prepare the apparatus for molding, the bus bars with their projecting contact blades are set up as shown in Fig. 1 where each contact blade is positioned in a guiding slot 28 of one of the guide blocks so that the blades are in alinement. The clamping blocks are then adjusted so that the parts 34, 34 of each block press against the edges of the two contact blades in the adjacent guide blocks 27. Thus all of the bus bars and blades are clamped in the relative positions which they occupy in the finished product. The pan is then filled with liquid to a predetermined level. The carrier is then swung from the position shown in Fig. 1 to that shown in Fig. 7. The bus bars and associated parts will swing about the axis 22 so that the edges of the bus bars will enter the liquid in the pan and as the carrier is swung farther downwardly the bus bars are sequentially immersed by sliding action so as to avoid the formation of bubbles beneath the bus bars.

When the ribbing block is forced into the liquid to molding position, the liquid rises by capillary attraction between the ribbing dies (see Fig. 8).

In the form of apparatus shown, plates 20' are provided extending inwardly from one of the end walls of the pan so as to leave slots 14" in the body 14 for mounting insulating barrier plates (not shown) at opposite sides of the central bus bar 11.

A suitable form of checking device may be provided for controlling the speed with which the carrier with the attached bus bars and associated parts are brought into molding position.

In Fig. 2a, we have shown a form of control or checking apparatus for the immersion movement of the carrier including an air cylinder 42 pivoted at 43 to a suitable support and having a piston rod 44 connected to the carrier flange 24.

The speed of immersion movement is regulated by the 4-way spool type hand operated valve 45 having an inlet 46 and exhaust outlet 47 and connected to the opposite ends of the air cylinder by pipes 48 and 49. The valves 50 and 51 provide for the free flow of air to the cylinder and control the flow from the cylinder so that the weight of the carrier will have no appreciable effect on the rate of immersion movement.

It will be understood that when the carrier with attached parts is brought into closed position, the apparatus and the contained liquid will be heated in order to solidify the plastic material of which the body is formed. After the plastic has become hardened, the clamping blocks are backed off by the screws 31 in order to release the respective blades. The carrier is then swung to open position leaving the formed unit including the body and embedded bus bars and blades in the pan from which the unit can be removed in any suitable manner.

What is claimed is:

1. Apparatus for forming a panelboard unit comprising a pan for holding an insulating material in liquid form, said pan being shaped to conform to the shape of the base of the panelboard unit, a carrier adapted to overlie and cover the pan, means mounted on the carrier for clamping and releasably supporting a plurality of flat bus bars provided with projecting contact blades and with terminal portions so that when the carrier has been brought to a position overlying said pan the bars are immersed in an insulating material in liquid form in the pan with the contact blades and the terminal portions projecting from the liquid, said means comprising spaced guide blocks secured to the carrier and provided with slots for receiving substantial portions of the contact blades while leaving side portions of the blades projecting from said slots, clamping means slidably mounted on said carrier opposite the open slot sides of said guide blocks, means between adjacent guide blocks for guiding said clamping means and means for moving said clamping block means toward said guide block means into engagement with the projecting side edges of the contact blades thereby to clamp the blades and bus bars for movement with said carrier to a position overlying said pan and for moving said clamping block means away from said guide block means to release the blades.

2. Apparatus for forming a panelboard unit comprising a pan for holding thermoplastic liquid, said pan being shaped to conform to the shape of the base of the unit, a carrier adapted to overlie and cover the pan, means mounted on the carrier for clamping and releasably supporting a plurality of flat bus bars provided with alined projecting connector blades and with terminal portions so that when the carrier has been brought to a position overlying said pan the bars are immersed in the liquid in the pan with the contact blades and the terminal portions projecting from the liquid, said means including a plurality of guide blocks secured to the carrier in spaced relation with each other and provided with slots closed on one side for receiving substantial portions of the contact blades while leaving side portions of the blades projecting from the open sides of said slots, clamping blocks slidably mounted on said carrier opposite the open slot sides of said guide blocks, there being one clamping block for each pair of said guide blocks and each of said clamping blocks being provided with a slot, ribbing blocks disposed between said guide blocks and extending into said slots in said clamping blocks so as to guide the movements of said clamping blocks toward and away from said guide blocks, and means for moving said clamping blocks toward said guide blocks into engagement with the projecting side edges of the contact blades thereby to clamp the blades for movement with said carrier to a position overlying said pan and for moving said clamping blocks away from said guide blocks to release the blades.

3. For use in the manufacture of a panel unit comprising a body of insulating material having embedded therein a plurality of substantially parallel spaced bus bars, said bus bars being provided with end wiring terminals offset flatwise and projecting from the body and with a plurality of intermediate contact blades secured to the bus bars and projecting from the body in flatwise alignment with each other, apparatus comprising a generally rectangular tray-shaped mold adapted to hold a predetermined amount of insulating material in liquid form, a flat carrier for the bus bars hinged to said mold, a plurality of guide blocks secured to said carrier in a row in spaced relation with each other, each of said guide blocks being provided with a slot closed on one side adapted to receive a substantial portion of a contact blade while leaving a side portion of the blade projecting from an open side of said slot in a direction parallel with said carrier, a plurality of clamping blocks slidably mounted on said carrier opposite the open slot sides of said guide blocks in spaced relation with each other, means for moving said clamping blocks toward said guide blocks into engagement with the edges of the projecting sides of the blades thereby to secure the blades to said carrier whereby the bus bars are secured to said carrier in substantially parallel spaced relation with each other, each of said clamping blocks extending across two of said guide blocks and being adapted to engage two of said blades and each of said clamping blocks being provided with a slot in its side adjacent the two oppositely disposed guide blocks and substantially coextensive with the space between said guide blocks, and ribbing blocks secured to said carrier between said guide blocks and extending into the slots in the oppositely disposed clamping blocks so as to guide the movements of said clamping blocks.

References Cited in the file of this patent

UNITED STATES PATENTS

| Number | Name | Date |
|---|---|---|
| 314,828 | Haines | Mar. 31, 1885 |
| 1,161,191 | Cook | Nov. 23, 1915 |
| 2,084,603 | True | June 22, 1937 |
| 2,136,609 | Butterfield et al. | Nov. 15, 1938 |
| 2,237,274 | Hailes | Apr. 1, 1941 |
| 2,266,887 | McCoy | Dec. 23, 1941 |
| 2,281,221 | Anderson | Apr. 28, 1942 |
| 2,296,016 | Bostwick | Sept. 15, 1942 |
| 2,308,649 | Dean | Jan. 19, 1943 |
| 2,351,529 | Luxenberger et al. | June 13, 1944 |
| 2,369,291 | Frank et al. | Feb. 13, 1945 |